(12) United States Patent
Lee et al.

(10) Patent No.: US 9,154,657 B2
(45) Date of Patent: Oct. 6, 2015

(54) DUPLEX SCANNING APPARATUS AND IMAGE FORMING APPARATUS HAVING THE SAME

(71) Applicant: Samsung Electronics Co., Ltd., Suwon-si, Gyeonggi-do (KR)

(72) Inventors: Sang-il Lee, Seongnam-si (KR); Dong-hun Lee, Seoul (KR); Myung-hee Jang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/739,195

(22) Filed: Jan. 11, 2013

(65) Prior Publication Data
US 2013/0182273 A1 Jul. 18, 2013

(30) Foreign Application Priority Data

Jan. 13, 2012 (KR) .................. 10-2012-0004525

(51) Int. Cl.
*H04N 1/04* (2006.01)
*H04N 1/00* (2006.01)
*H04N 1/12* (2006.01)
*H04N 1/203* (2006.01)

(52) U.S. Cl.
CPC .......... *H04N 1/0066* (2013.01); *H04N 1/00718* (2013.01); *H04N 1/00774* (2013.01); *H04N 1/1235* (2013.01); *H04N 1/2032* (2013.01); *H04N 2201/02402* (2013.01)

(58) Field of Classification Search
CPC ..... H04N 1/193; H04N 1/12; H04N 1/00602; H04N 1/0057; H04N 1/00588
USPC ......... 358/496, 498, 482, 483, 486, 488, 474, 358/512–514, 505, 406, 504; 399/364, 367, 399/371, 372, 374, 13
See application file for complete search history.

(56) References Cited

U.S. PATENT DOCUMENTS 5,764,382 A * 6/1998 Shiraishi ........................ 358/496
7,391,538 B2 * 6/2008 Lien .............................. 358/461

(Continued)

FOREIGN PATENT DOCUMENTS

JP 2002-359724 12/2002
JP 2007013625 A * 1/2007
JP 2009290441 A * 12/2009

OTHER PUBLICATIONS

Extended European Search Report dated Apr. 23, 2015 in European Patent Application No. 12199808.2, 9 pages.

*Primary Examiner* — Cheukfan Lee
(74) *Attorney, Agent, or Firm* — Staas & Halsey LLP

(57) ABSTRACT

A duplex scanning apparatus includes a scan case including a platen glass, a first scanning module disposed inside the scan case, a scanning module moving unit that is disposed inside the scan case perpendicular to the first scanning module and guides a movement of the first scanning module, and an automatic document feeding apparatus disposed on a top side of the scan case to cover the platen glass including a feeding frame in which a document moving route is formed, a scanning module opening formed on an upper side of the document moving route in the feeding frame, a second scanning module disposed in the scanning module opening, and a scanning module adjusting unit formed to rotate the second scanning module by a predetermined angle based on a point of the feeding frame with respect to the scanning module opening.

21 Claims, 14 Drawing Sheets

(56) References Cited

U.S. PATENT DOCUMENTS

| | | |
|---|---|---|
| 2006/0039043 A1 | 2/2006 | Yeh et al. |
| 2006/0209361 A1* | 9/2006 | Sato .............................. 358/474 |
| 2006/0250664 A1* | 11/2006 | Chien ........................... 358/474 |
| 2007/0002401 A1 | 1/2007 | Park |
| 2007/0279710 A1 | 12/2007 | Wang et al. |
| 2008/0028573 A1 | 2/2008 | Tsai et al. |
| 2008/0231913 A1 | 9/2008 | Kurotsu et al. |
| 2013/0293932 A1* | 11/2013 | Sugai et al. ................... 358/406 |

* cited by examiner

LENGTHWISE DIRECTION X OF
FIRST SCANNING MODULE

DUPLEX SCANNING APPARATUS AND IMAGE FORMING APPARATUS HAVING THE SAME

CROSS-REFERENCE TO RELATED APPLICATIONS

This application claims the benefit under 35 U.S.C. §119 (a) from Korean Patent Application No. 2012-0004525 filed Jan. 12, 2012 in the Korean Intellectual Property Office, the disclosure of which is incorporated herein by reference in its entirety.

BACKGROUND

1. Field

The present general inventive concept relates to an image scanning apparatus. More particularly, the present general inventive concept relates to a duplex scanning apparatus having a scanning module adjusting device that can adjust a squareness between a document moving direction and a lengthwise direction of an image sensor of a scanning module and an image forming apparatus having the same.

2. Description of the Related Art

Generally, an automatic document feeding apparatus usable with a scanning apparatus is configured of one scanning module having an image sensor to scan a document and one automatic document feeding unit to automatically feed the document to the scanning module. Accordingly, to adjust a position between the two parts, that is, a position between the scanning module and the automatic document feeding unit has to be adjusted to prevent skew from occurring in an image scanned by the scanning module.

However, a duplex scanning apparatus that can scan both sides of a document during once feeding of the document is configured of two scanning modules and one automatic document feeding unit to automatically feed the document to the two scanning modules. Accordingly, to prevent the occurrence of skew, the duplex scanning apparatus needs to adjust a position relationship among three parts, that is, the two scanning modules and the one automatic document feeding unit. However, since the duplex scanning apparatus needs to adjust the position relationship among the three parts, that is, the two scanning modules and the one automatic document feeding unit, the position adjustment thereof is relatively more difficult than that of the one side scanning apparatus.

Accordingly, when the position of the scanning module is adjusted in order to prevent the occurrence of skew in the duplex scanning apparatus, a scanning apparatus can be developed that can easily adjust positions of scanning modules, especially disposed inside of an automatic document feeding apparatus.

SUMMARY

The present general inventive concept has been developed in order to overcome the above drawbacks and other problems associated with the conventional arrangement. In particular, the present general inventive concept relates to a duplex scanning apparatus that can easily adjust a position of scanning module inside of the duplex scanning apparatus. The present general inventive concept relates to a duplex scanning apparatus having a position of a scanning module that can easily be adjusted to minimize and/or prevent skew from occurring during scanning and an image forming apparatus having the same.

Additional features and utilities of the present general inventive concept will be set forth in part in the description which follows and, in part, will be obvious from the description, or may be learned by practice of the general inventive concept.

The foregoing and/or other features and utilities of the present general inventive concept can substantially be achieved by providing a duplex scanning apparatus, which may include a scan case comprising a platen glass, a first scanning module disposed inside the scan case, a scanning module moving unit that is disposed inside of the scan case perpendicular to the first scanning module and that guides movement of the first scanning module, and an automatic document feeding apparatus disposed on a top side of the scan case to cover the platen glass including a feeding frame in which a document moving route is formed, a scanning module opening formed on an upper side of the document moving route in the feeding frame, a second scanning module disposed in the scanning module opening, and a scanning module adjusting unit formed to rotate the second scanning module at a predetermined angle based on a point of the feeding frame with respect to the scanning module opening.

The scanning module adjusting unit may include a module supporting bracket that supports the second scanning module and is disposed to rotate with respect to the scanning module opening based on a rotation shaft disposed on the feeding frame, and a module adjusting portion that is disposed in the feeding frame and applies force to the module supporting bracket so that the module supporting bracket is rotated based on the rotation shaft.

The scanning module adjusting unit may include an indicating portion disposed on a side of the module supporting bracket, and a scale portion formed on a portion of the feeding frame corresponding to the indicating portion. When the module supporting bracket rotates, the indicating portion is moved with respect to the scale portion.

The module supporting bracket may include a plurality of fixing portions to fix the module supporting bracket to the feeding frame.

Each of the plurality of fixing portions may include a fixing protrusion projecting from a side surface of the module supporting bracket, and an elongated hole formed on the fixing protrusion.

The module adjusting portion may include a female screw portion formed to face the second scanning module in the feeding frame, and an adjusting screw that is screwed with the female screw portion and presses the module supporting bracket.

The module adjusting portion may include an elastic member that is disposed between the module supporting bracket and the feeding frame and such that the adjusting screw can maintain contact with the module supporting bracket.

The plurality of fixing portions may be formed to fix a vertical position of the second scanning module, and the module adjusting portion may be formed to fix a horizontal position of the second scanning module.

The module supporting bracket may be formed integrally with the second scanning module.

The duplex scanning apparatus may include a second document pressing member disposed in contact with a bottom surface of the second scanning module below the second scanning module.

Exemplary embodiments of the present general inventive concept may also provide an image forming apparatus that may include a duplex scanning apparatus having the above-described features, a main body disposed to support the duplex scanning apparatus, a printing media supplying unit that is disposed inside of the main body and stores and supplies printing media, and an image forming unit that forms an image on a printing medium supplied from the printing media supplying unit.

The scanning module adjusting unit may include a module supporting bracket having a rotation hole to receive a rotation shaft, the module supporting bracket to support the scanning module adjusting unit and to rotate according to a movement of the rotation shaft that is inserted into the rotation hole, and a module adjusting portion to adjust a position of the second scanning module in a horizontal direction and to support the module supporting bracket to allow the module supporting bracket to rotate based on a movement of the rotation shaft that is inserted into the rotation hole.

The module supporting bracket may further include an indicating portion to display a rotation angle of the module supporting bracket.

Exemplary embodiments of the present general inventive concept may also provide an automatic document feeding apparatus including a feeding frame in which a document moving route is formed, a scanning module opening formed on one side of the document moving route, a scanning module disposed in the scanning module opening to scan a document that is advanced along the document moving route, and a scanning module adjusting unit to rotate the scanning module at a predetermined angle with respect to a document moving direction of the document moving route to minimize the occurrence of skew.

The scanning module adjusting unit may include a module supporting bracket having a rotation hole to receive a rotation shaft, wherein the module supporting bracket can support the scanning module adjusting unit and rotate according to a movement of the rotation shaft that is inserted into the rotation hole, and a module adjusting portion to support to the module supporting bracket to allow the module supporting bracket to rotate according to a movement of the rotation shaft that is inserted into the rotation hole.

The module supporting bracket may also include an indicating portion to display a rotation angle of the module supporting bracket.

An adjusting member disposed in the feeding frame of the automatic document feeding apparatus can be rotated so that the scanning module forms a right angle to the document moving direction of the document moving route.

Exemplary embodiments of the present general inventive concept may also provide a method of minimizing skew in a duplex scanning apparatus having a first scanning module and a second scanning module, the method including determining whether there is skew in a first image of a first side of a document scanned by the first scanning module, adjusting a position between a document moving direction of a document moving route in the duplex scanning apparatus and a lengthwise direction of the first scanning module if skew is detected in the first image, determining whether there is skew in a second image of a second side of the document scanned by the second scanning module, and adjusting a position between the second scanning module and the document moving direction of the document moving route if skew is detected in the second image.

The method described above may also include adjusting a hinge position of the duplex scanning apparatus so that the document moving direction of the document moving direction of the document moving route to form a right angle to the lengthwise direction of the first scanning module.

The method can also include adjusting a scanning module adjusting unit disposed in the duplex scanning apparatus so that the second scanning module forms a right angle with the document moving direction of the document moving route.

The method may further include rotating an adjusting member disposed in a feeding frame of the duplex scanning apparatus so that the second scanning module rotates and forms a right angle with the document moving direction of the document moving route.

Other objects, advantages and salient features of the present general inventive concept will become apparent from the following detailed description, which, taken in conjunction with the annexed drawings, discloses preferred embodiments.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
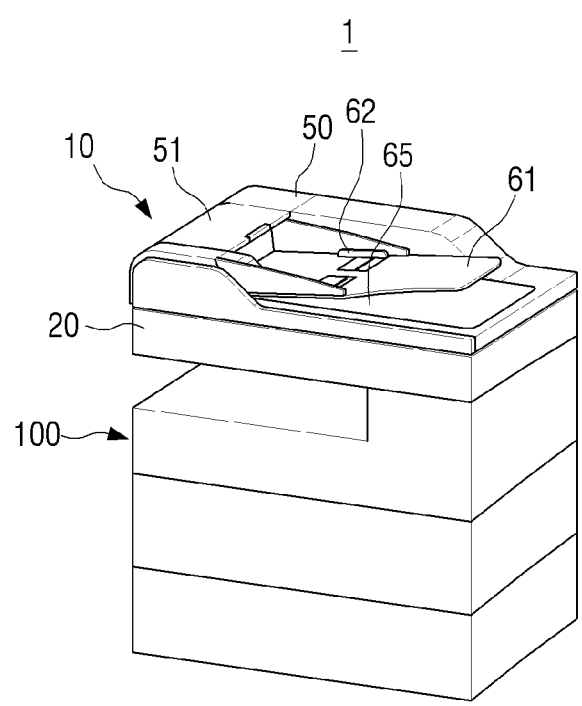
FIG. 1 is a perspective view illustrating an image forming apparatus including a duplex scanning apparatus according to exemplary embodiments of the present general inventive concept.

Hereinafter, certain exemplary embodiments of the present general inventive concept will be described in detail with reference to the accompanying drawings. Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
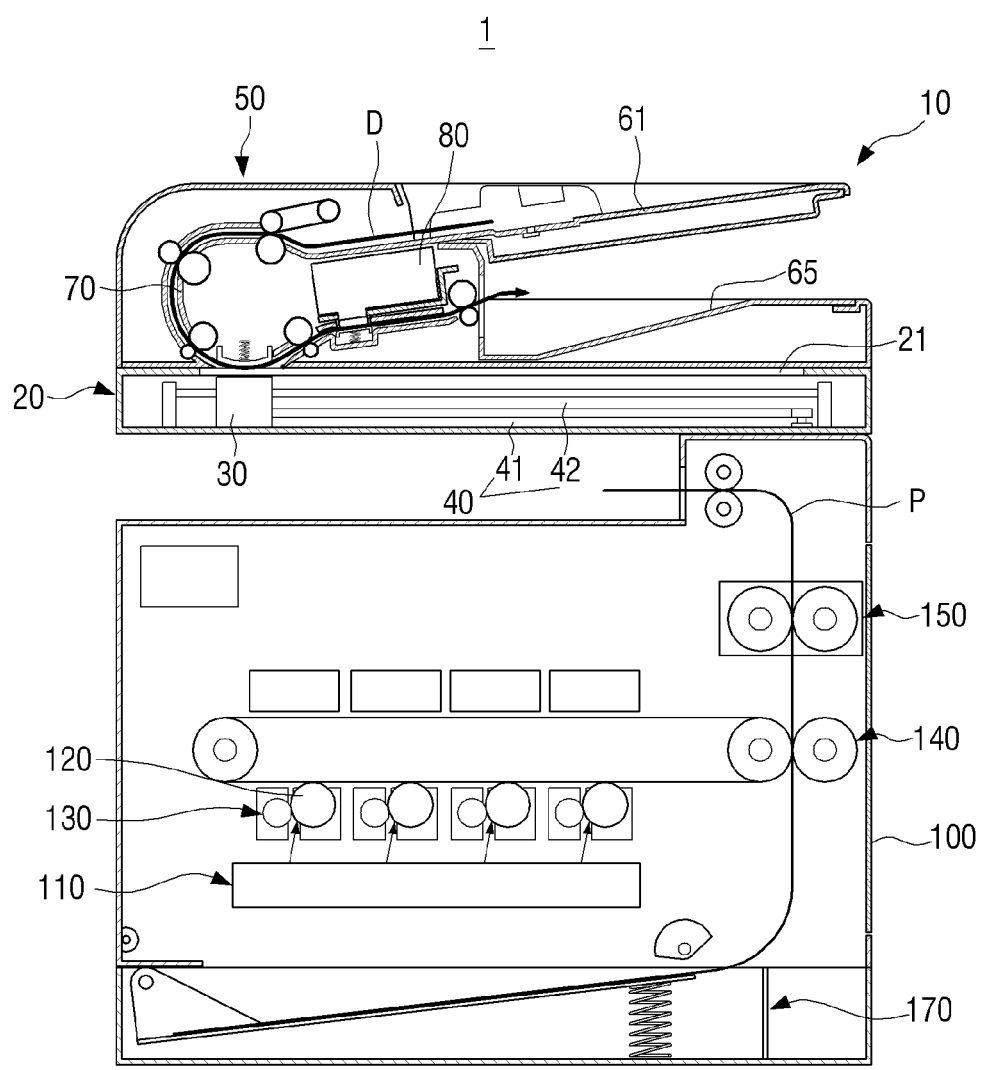
FIG. 2 is a sectional view illustrating the image forming apparatus of FIG. 1.
Figure 2A:
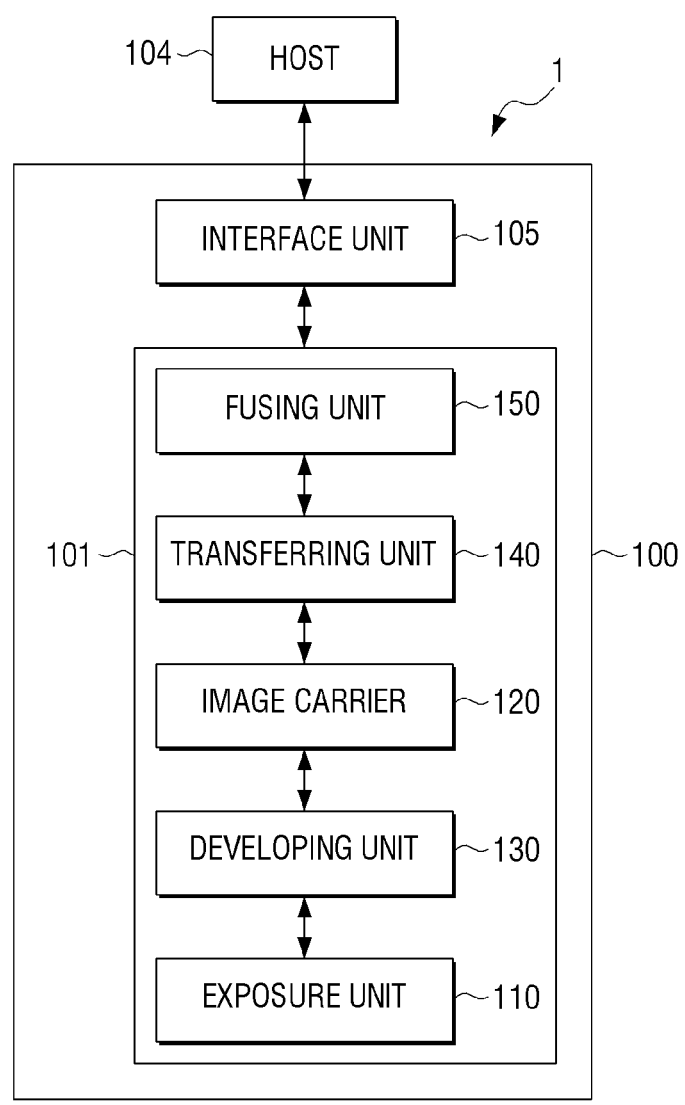
FIG. 2A is a block diagram illustrating a host device sending printing data to the image forming unit of the duplex scanning apparatus.
Figure 3:
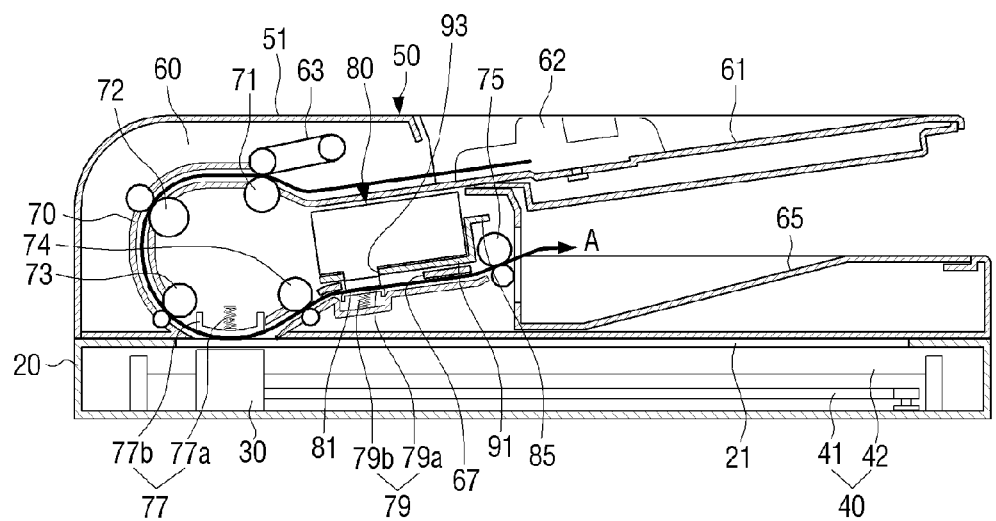
FIG. 3 is a sectional view schematically illustrating the duplex scanning apparatus of the image forming apparatus of FIG. 1.
Figure 3A:
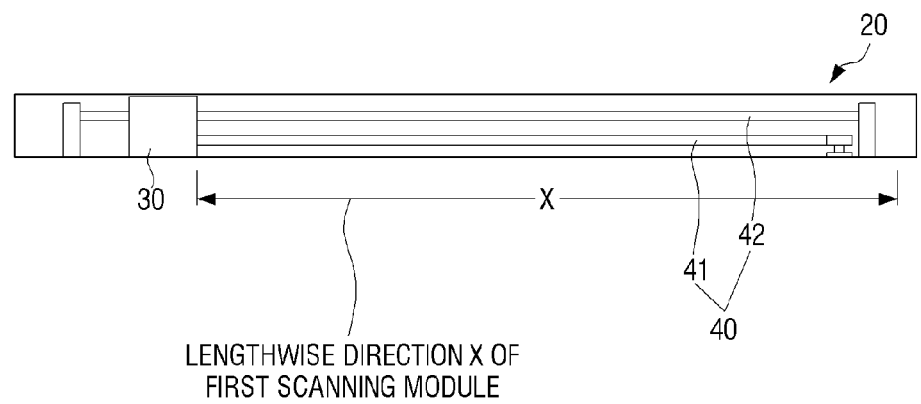
FIG. 3A is a sectional view schematically illustrating the lengthwise direction X of the a first scanning module in the duplex scanning apparatus.
Figure 4:
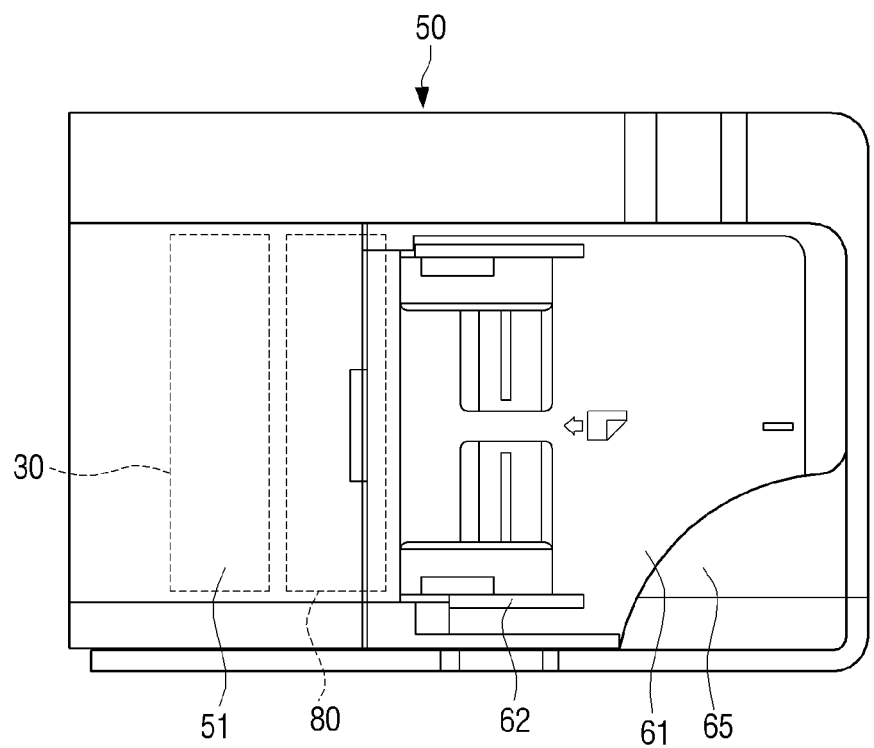
FIG. 4 is a plan view illustrating the duplex scanning apparatus of FIG. 3.
Figure 5:
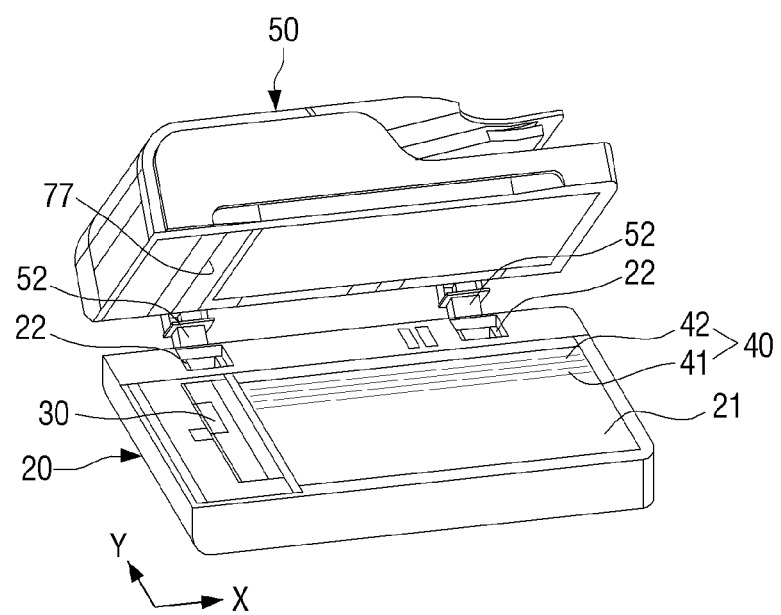
FIG. 5 is a perspective view illustrating the duplex scanning apparatus of the image forming apparatus of FIG. 1 when an automatic document feeding apparatus thereof is open.
Figure 5A:
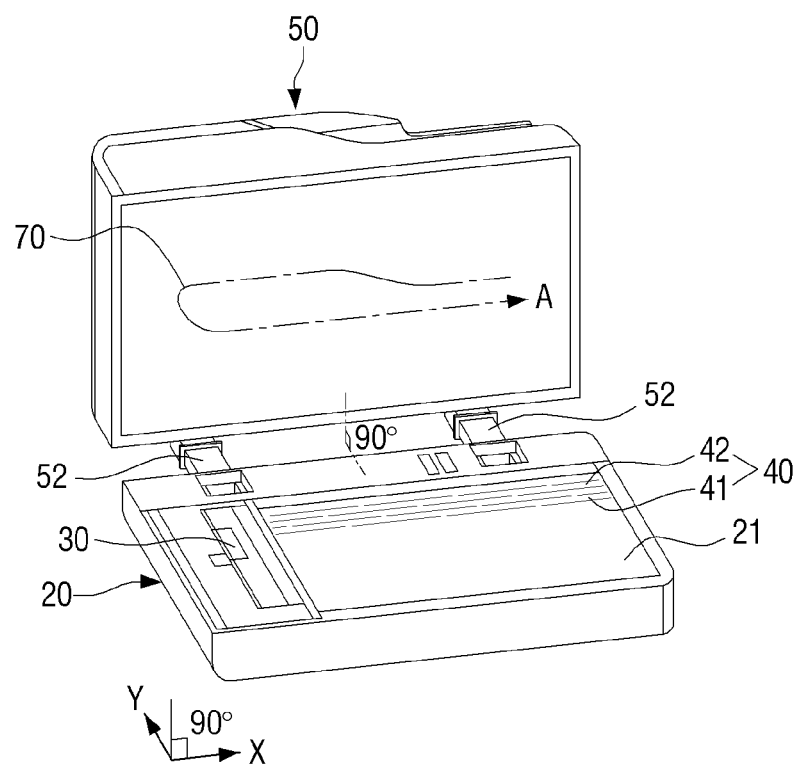
FIG. 5A is a perspective view illustrating the duplex scanning apparatus of the image forming apparatus of FIG. 5 when a document moving direction of a document moving route is adjusted to form a right angle with respect to the first scanning module.

FIG. 1 is a perspective view illustrating an image forming apparatus including a duplex scanning apparatus according to exemplary embodiments of the present general inventive concept. FIG. 2 is a sectional view illustrating the image forming apparatus of FIG. 1, FIG. 2A is a block diagram illustrating a host device sending printing data to the image forming unit of the duplex scanning apparatus, and FIG. 3 is a sectional view schematically illustrating the duplex scanning apparatus of the image forming apparatus of FIG. 1. FIG. 3A is a sectional view illustrating the lengthwise direction X of a first scanning module in the duplex scanning apparatus. Further, FIG. 4 is a plan view illustrating the duplex scanning apparatus of FIG. 3, and FIG. 5 is a perspective view illustrating the duplex scanning apparatus of the image forming apparatus of FIG. 1 when an automatic document feeding apparatus thereof is open. FIG. 5A is a perspective view illustrating the duplex scanning apparatus of the image forming apparatus of FIG. 5 when a document moving direction of a document moving route is adjusted to form a right angle with respect to the first scanning module.

Figure 6:
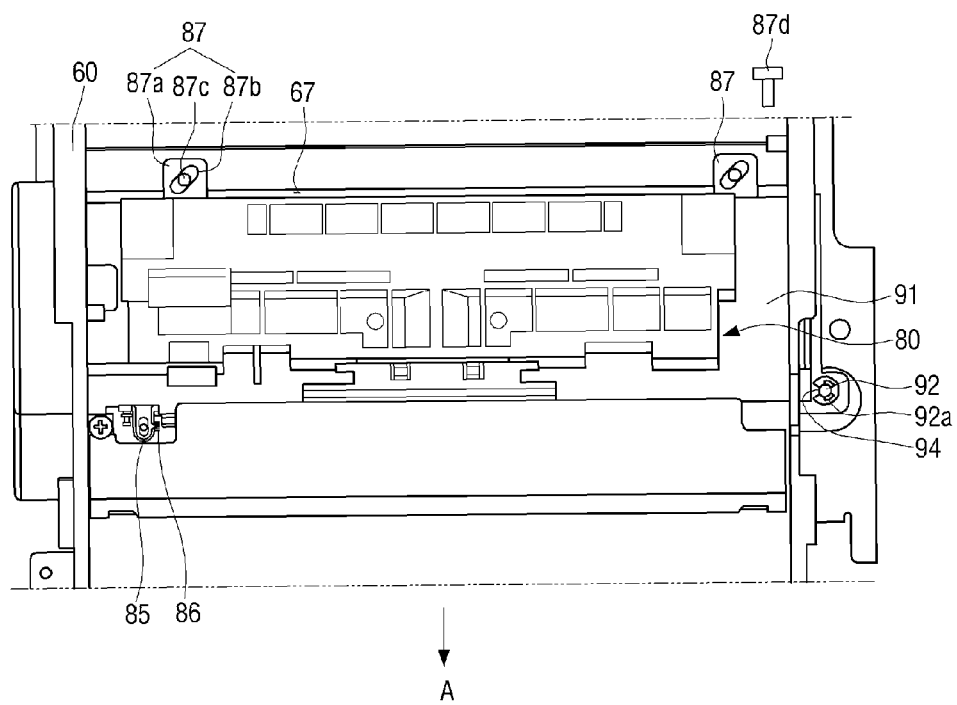
FIG. 6 is a partial view illustrating a feeding frame of a duplex scanning apparatus according to exemplary embodiments of the present general inventive concept on which a second scanning module is disposed.
Figure 7:
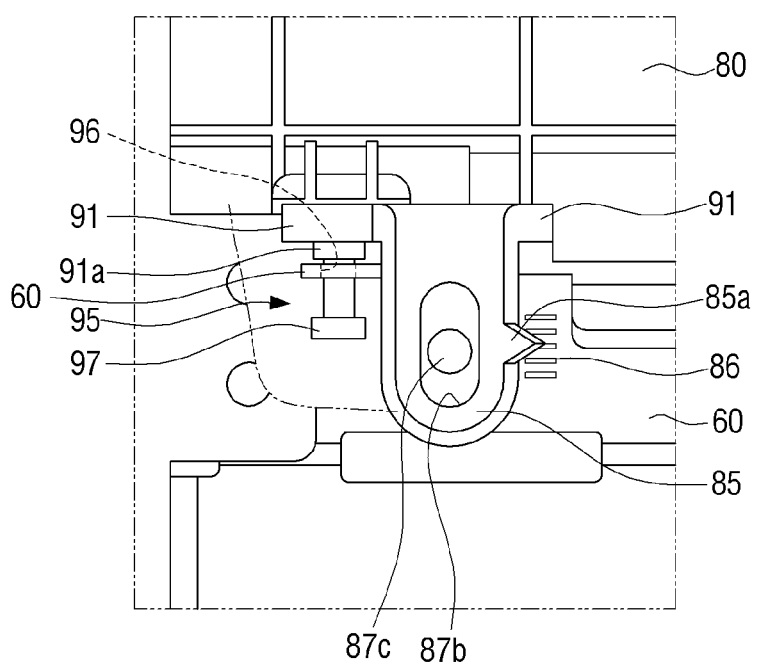
FIG. 7 is a partial view illustrating an indicating portion and a scale portion of a scanning module adjusting unit of the duplex scanning apparatus of FIG. 6.
Figure 8:
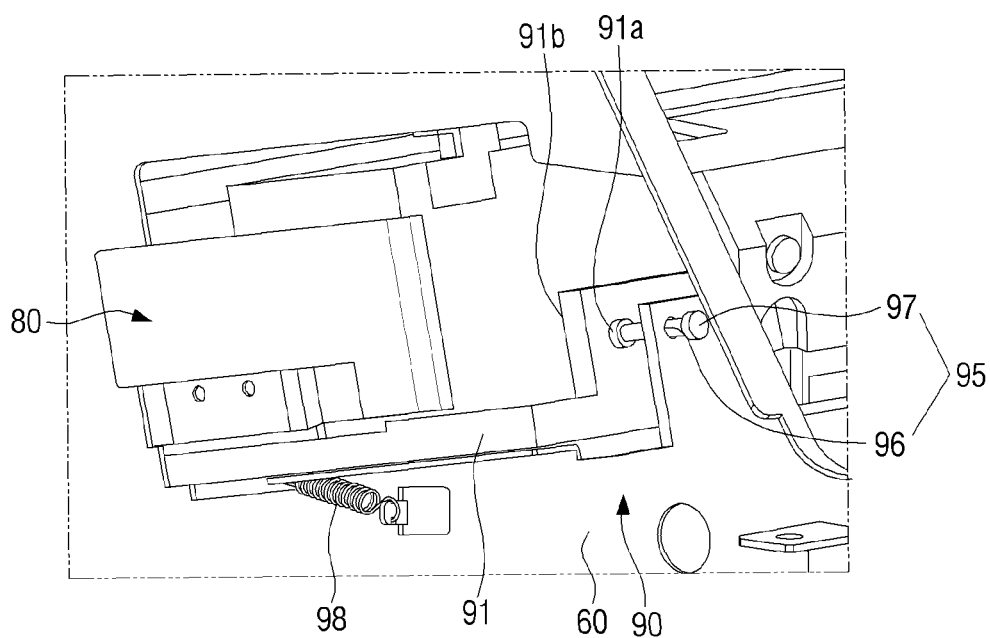
FIG. 8 is a partially perspective view illustrating a module adjusting portion of a scanning module adjusting unit of the duplex scanning apparatus of FIG. 6.
Figure 9:
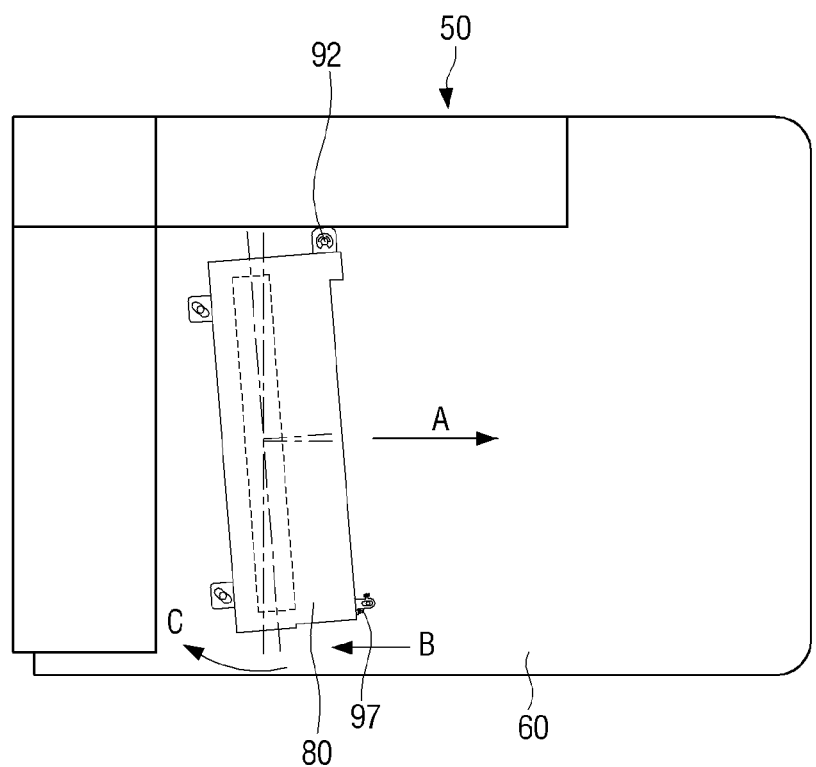
FIG. 9 is a view illustrating a state in that a second scanning module is inclined with respect to a moving direction of a document in a duplex scanning apparatus according to exemplary embodiments of the present general inventive concept.
Figure 10:
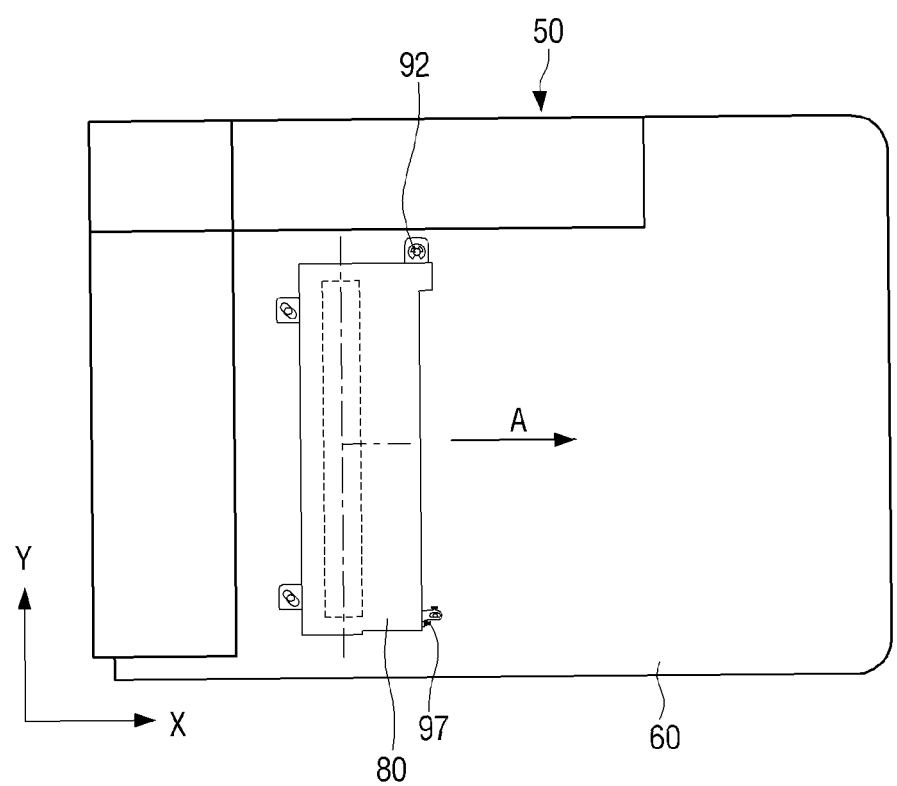
FIG. 10 is a view illustrating a state in that a squareness of a second scanning module is adjusted by using a scanning module adjusting unit in a duplex scanning apparatus according to an exemplary embodiments of the present general inventive concept.
Figure 11:
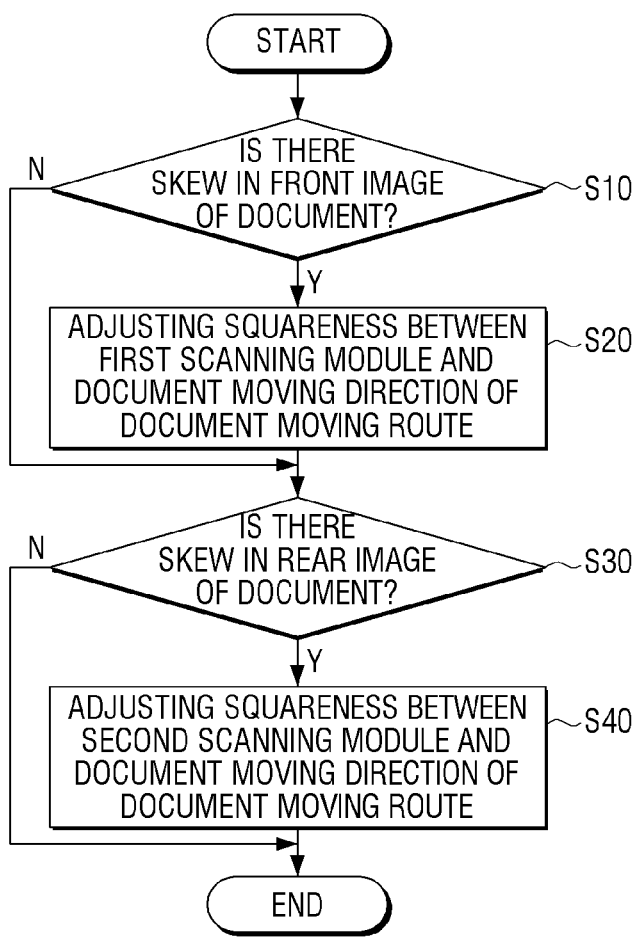
FIG. 11 is a flow chart illustrating a method of adjusting scanning modules of a duplex scanning apparatus according to exemplary embodiments of the present general inventive concept.

FIG. 6 is a partial view illustrating a feeding frame of a duplex scanning apparatus according to exemplary embodiments of the present general inventive concept on which a second scanning module is disposed. FIG. 7 is a partial view illustrating an indicating portion and a scale portion of a scanning module adjusting unit of the duplex scanning apparatus of FIG. 6. FIG. 8 is a partially perspective view illustrating a module adjusting portion of a scanning module adjusting unit of the duplex scanning apparatus of FIG. 6. FIG. 9 is a view illustrating a state in that a second scanning module is inclined with respect to a moving direction of a document in a duplex scanning apparatus according to exemplary embodiments of the present general inventive concept. FIG. 10 is a view illustrating a state in that a squareness of a second scanning module is adjusted by using a scanning module adjusting unit in a duplex scanning apparatus according to exemplary embodiments of the present general inventive concept. FIG. 11 is a flow chart illustrating a method of adjusting scanning modules of a duplex scanning apparatus according to exemplary embodiments of the present general inventive concept.

Referring to FIGS. 1 and 2, an image forming apparatus 1 including a duplex scanning apparatus 10 according to an exemplary embodiment of the present general inventive concept includes the duplex scanning apparatus 10 and a main body 100 of the image forming apparatus 1.

The duplex scanning apparatus 10 can scan both sides of a document during a single feeding of the document. The duplex scanning apparatus 10 can include a scan case 20, a first scanning module 30, a scanning module moving unit 40, and an automatic document feeding apparatus 50.

The scan case 20 is formed in a substantially rectangular parallelepiped shape and supports a platen glass 21 on which the document is placed. The first scanning module 30 is disposed below the platen glass 21 and inside the scan case 20. In case of scanning only one side of the document, the document is placed on the platen glass 21, and the duplex scanning apparatus 10 is operated so that the first scanning module 30 moves to scan the one side of the document. The scanning module moving unit 40 that moves the first scanning module 30 is disposed below the platen glass 21 and inside the scan case 20.

Referring to FIGS. 3A and 5, the scanning module moving unit 40 is disposed at a right angle with respect to the first scanning module 30 inside the scan case 20 and may include a driving portion 41 and a guiding portion 42. The driving portion 41 moves the first scanning module 30 in a lengthwise direction of the platen glass 21 (X direction) below the platen glass 21. The driving portion 41 may include a ball screw, a timing belt, etc. that are driven by a motor so as to move the first scanning module 30 in the X-direction. The guiding portion 42 allows the first scanning module 30 moved by the driving portion 41 to move in a straight line along the guiding portion 42. The guiding portion 42 may include a guide shaft with a guide bushing that is disposed on the guide shaft and moves along the guide shaft. Linear motion guides may be used as the guiding portion 42. When performing a duplex scanning, the scanning module moving unit 40 allows the first scanning module 30 not to be moved and to maintain a standstill position. However, when performing one side scanning, the scanning module moving unit 40 moves the first scanning module 30.

The first scanning module 30 scans the document and generates image data. The first scanning module 30 may include an image sensor such as a charge coupled device (CCD) or a complementary metal oxide semiconductor image sensor (CMOS). The first scanning module 30 is stopped at a predetermined position when the automatic document feeding apparatus 50 feeds the document and the duplex scanning is performed. When scanning the document placed on the platen glass 21, the first scanning module 30 is moved in the X direction by the scanning module moving unit 40. The structure of the first scanning module 30 is the same as or similar to a scanning module used in a conventional flat bed scanner. Therefore, a detailed description thereof will be omitted.

Referring to FIGS. 2 and 5, the automatic document feeding apparatus 50 is disposed on a top side of the scan case 20 to cover the platen glass 21, and supplies the first scanning module 30 with documents to scan. The automatic document feeding apparatus 50 is mounted to the scan case 20 by hinges 52 so the automatic document feeding apparatus 50 can cover the platen glass 21, and can be opened via the hinges 52 to expose the platen glass 21. The two hinges 52 are disposed in the automatic document feeding apparatus 50 and two hinge securing portions 22 corresponding to the two hinges 52 are provided in the scan case 20. Accordingly, the two hinges 52 of the automatic document feeding apparatus 50 are inserted into the two hinge securing portions 22 of the scan case 20 so that the automatic document feeding apparatus 50 can be opened or closed with respect to the scan case 20.

The automatic document feeding apparatus 50 includes a feeding frame 60, a second scanning module 80, and a scanning module adjusting unit 90.

For example, as illustrated in FIG. 3, the feeding frame 60 includes a feeding tray 61, a document pickup unit 63, a document moving route 70, and a discharging tray 65. The feeding tray 61 is formed in the feeding frame 60 to store predetermined sheets of documents to be scanned. The feeding tray 61 can include a pair of guiding members 62 to guide both side ends of the document. The document pickup unit 63 is disposed in a leading end of the feeding tray 61 and picks up the documents loaded on the feeding tray 61 one by one.

The document moving route 70 may be formed in the feeding frame 60 to guide the document picked up by the document pickup unit 63 to the first scanning module 30 and the second scanning module 80. The document moving route 70 may be formed in a substantially C shape. A plurality of document carrying rollers 71 to 75 are arranged along the document moving route 70 and carry the document picked up by the document pickup unit 63 to the discharging tray 65. Although document carrying rollers 71 to 75 are illustrated, the number of document carrying rollers and their positions inside of the document feeding apparatus 50 is not limited to the embodiment illustrated in FIG. 3 to carry a document along the document moving route 70.

In FIG. 3, the duplex scanning apparatus 10 according to the exemplary embodiments of the present general inventive concept has five carrying rollers 71 to 75 arranged in the document moving route 70. Hereinafter, a carrying roller 71 adjacent to the document pickup unit 63 is referred to a first carrying roller, and a carrying roller 75 adjacent to the discharging tray 65 is referred to a fifth carrying roller. Also, three carrying rollers 72, 73, and 74 between the first and fifth carrying rollers 71 and 75 are referred to a second carrying roller, a third carrying roller, and a fourth carrying roller, respectively.

A first document pressing member 77 is disposed at a position corresponding to the first scanning module 30 in the document moving route 70 and allows the document to contact with the platen glass 21. In this exemplary embodiment, the first document pressing member 77 is disposed between the third carrying roller 73 and the fourth carrying roller 74. Accordingly, the document having passed by the third carrying roller 73 passes through between the first document pressing member 77 and the top surface of the first scanning module 30, and is moved to the fourth carrying roller 74. The first document pressing member 77 includes a first pressing plate 77b in contact with the document and a first pressing spring 77a pressing the first pressing plate 77b toward the first scanning module 30. If a moving direction of the document being carried by the document moving route 70 (hereinafter, referred to as a document moving direction of the document moving route 70) (see arrow A in FIG. 3) does not form a right angle with a lengthwise direction of the first scanning module 30 (Y direction, see FIG. 5), skew may occur in an image of the one side of the document scanned by the first scanning module 30.

Referring to FIGS. 3, 3A, and 5, a squareness between the document moving direction (arrow A) of the document moving route 70 and the lengthwise direction X of the first scanning module 30 can be adjusted by a position of the hinges 52 connecting the automatic document feeding apparatus 50 and the scan case 20. In other words, if the hinge position of the automatic document feeding apparatus 50 in which the document moving route 70 is formed is adjusted with respect to the scan case 20, an angle of the document moving direction (arrow A) of the automatic document feeding apparatus 50 with respect to the lengthwise direction of the first scanning module 30 changes, and the squareness between the document moving direction (arrow A) of the document moving route 70 and the lengthwise direction of the first scanning module 30 can be adjusted. If the document moving direction (arrow A) of the document moving route 70 and the lengthwise direction of the first scanning module 30 are adjusted to be at a right angle with respect to each other, skew may be minimized and/or prevented in the image data generated by the first scanning module 30 when the automatic document feeding apparatus 50 is closed to cover the platen glass 21 and the document is scanned by the first scanning module 30.

Referring to FIG. 3A, the lengthwise direction X of the first scanning module 30 is illustrated. The first scanning module 30 can scan a front side of a document inserted into the feeding tray 61 of the automatic document feeding apparatus 50. The first scanning module 30 can also be perpendicular to the document moving direction A of the document moving route 70 when the automatic document feeding apparatus 50 is opened and the hinges 52 are adjusted. The hinges 52 are adjusted so that the first scanning module 30 can become aligned with the document moving direction A of the document moving route 70 so that when the automatic document feeding apparatus 50 is closed to cover the platen glass 21, skew to the document to be scanned can be minimized and/or prevented.

Referring to FIG. 3, a scanning module opening 67 is formed on an upper side of the document moving route 70 of the feeding frame 60. The second scanning module 80 is disposed in the scanning module opening 67 and scans the rear side of the document that the first scanning module 30 scans. In other words, if the one side of the document that the first scanning module 30 scans is referred to a front side, the other side of the document that the second scanning module 80 scans is referred to a rear side of the document. The second scanning module 80 has an image sensor and the image sensor is disposed on a bottom surface 91 of the second scanning module 80 to scan the document passing through the document moving route 70. The structure and function of the second scanning module 80 is the same as or similar to the first scanning module 30. Therefore, a detail description thereof will be omitted.

The discharging tray 65 is formed below the feeding tray 61 to receive the document that has passed through the document moving route 70. Accordingly, the document that was picked up in the feeding tray 61 and then passed through the first scanning module 30 and the second scanning module 80 is loaded on the discharging tray 65.

Referring to FIGS. 3 and 8, the scanning module adjusting unit 90 is configured to adjust a squareness of the second scanning module 80 with respect to the document moving direction (arrow A) of the document moving route 70 of the automatic document feeding apparatus 50 and is formed to rotate the second scanning module 80 a predetermined angle with respect to the scanning module opening 67. If the second scanning module 80 becomes perpendicular to the document moving direction (arrow A) of the document moving route 70, both the second scanning module 80 and the first scanning module 30 become perpendicular to the document moving direction (arrow A) of the document moving route 70. Accordingly, when the first scanning module 30 and the second scanning module 80 scan both sides of the document while the automatic document feeding apparatus 50 feeds the document, skew can be minimized and/or prevented in the images scanned by the first and second scanning modules 30 and 80.

Figure 3B:
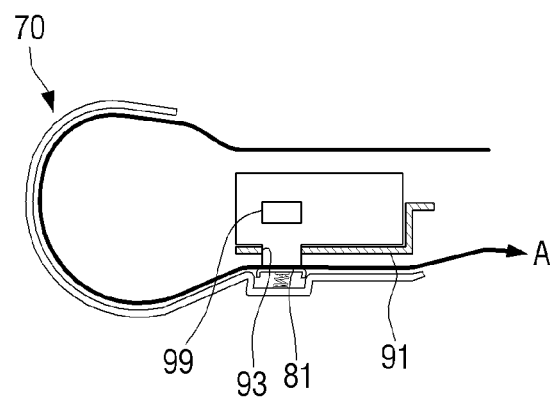
FIG. 3B is a sectional view schematically illustrating the scan hole and image sensor in the second scanning module.

Referring to FIGS. 3, 6, 7, and 8, the scanning module adjusting unit 90 may include a module supporting bracket 91 and a module adjusting portion 95. The module supporting bracket 91 fixes and supports the second scanning module 80, and is disposed above the scanning module opening 67 formed on the feeding frame 60 so as to rotate with respect to the scanning module opening 67 based on a rotation shaft 92. As illustrated in FIG. 3B, a scan hole 93 is formed on the module supporting bracket 91 so that the image sensor of the second scanning module 80 can scan the document passing through the document moving route 70. A surface 81 of second scanning module 80 on which the image sensor is positioned is exposed through the scan hole 93.

Referring to FIG. 3B, a scan hole 93 is formed on the module supporting bracket 91 so that the image sensor 99 of the second scanning module 80 can scan the document moving along the document moving route 70. A surface 81 of the second scanning module 80 on which the image sensor 99 is positioned is exposed through the scan hole 93.

Referring to FIG. 6, the rotation shaft 92 is disposed near the scanning module opening 67 of the feeding frame 60. The module supporting bracket 91 is provided with a rotation hole 94 in which the rotation shaft 92 can be inserted. Accordingly, if the rotation shaft 92 is inserted into the rotation hole 94, the module supporting bracket 91 can rotate based on the rotation shaft 92. The rotation hole 94 is formed around one corner of the module supporting bracket 91 formed in a substantially rectangular shape. In order to minimize and/or prevent the module supporting bracket 91 from coming off the rotation shaft 92, the rotation shaft 92 is fixed to the rotation hole 94 by a fixing member 92a such as an E-ring.

Referring to FIG. 7, the module adjusting portion 95 is disposed in the feeding frame 60 and is formed to adjust a position of the second scanning module 80 in a horizontal direction thereof. In other words, the module adjusting portion 95 is formed to support the module supporting bracket 91 so that the module supporting bracket 91 can be rotated based on the rotation shaft 92. Here, the horizontal direction means a direction parallel to the surface on which the scanning module opening 67 of the feeding frame 60 is formed.

Referring to FIGS. 7 and 8, the module adjusting portion 95 includes a female screw portion 96 formed on the feeding frame 60 and an adjusting screw 97 that is screwed with the female screw portion 96 and moves in a straight line. A screw hole of the female screw portion 96 is formed to face the second scanning module 80. A screw inserting portion 91a in which a leading end of the adjusting screw 97 is inserted may be provided on the module supporting bracket 91. The screw inserting portion 91a is formed on a projecting portion 91b projecting upwardly from a side of the module supporting bracket 91 to face the female screw portion 96. If the adjusting screw 97 is rotated in one direction, the adjusting screw 97 moves forward with respect to the female screw portion 96 to press the module supporting bracket 91. If the adjusting screw 97 moves forward, the module supporting bracket 91 is rotated in one direction based on the rotation shaft 92. Then, if the adjusting screw 97 is rotated in an opposite direction, the adjusting screw 97 is moved backward with respect to the female screw portion 96 and does not press the module supporting bracket 91.

Referring to FIG. 8, an elastic member 98 may be disposed between the module supporting bracket 91 and the feeding frame 60 on which the female screw portion 96 is formed, and pull the module supporting bracket 91 toward the module adjusting portion 95. In this case, if the adjusting screw 97 is rotated in the opposite direction so as to be moved backward with respect to the female screw portion 96, the module supporting bracket 91 is rotated in the opposite direction based on the rotation shaft 92 by the elastic member 98 as much as the adjusting screw 97 is moved backward. Accordingly, if the elastic member 98 is disposed between the module supporting bracket 91 and the feeding frame 60 on which the female screw portion 96 is provided, the module supporting bracket 91 and the leading end of the adjusting screw 97 always may maintain in contact with each other. Therefore, the position of the module supporting bracket 91 can be precisely adjusted by the adjusting screw 97.

Referring to FIG. 7, alternatively, the adjusting screw 97 may be coupled to the module supporting bracket 91 so that the leading end of the adjusting screw 97 does not move in an axial direction thereof and may rotate with respect to module supporting bracket 91. In this case, although no elastic member 98 is disposed between the module supporting bracket 91 and the feeding frame 60, the module supporting bracket 91 can be rotated in both directions based on the rotation shaft 92 according to movement of the adjusting screw 97. However, as in FIG. 8, if the elastic member 98 is disposed between the module supporting bracket 91 and the feeding frame 60 on which the female screw portion 96 is formed, a gap between the module supporting bracket 91 and the adjusting screw 97 can be removed so that the position of the module supporting bracket 91 can be precisely adjusted by the adjusting screw 97.

As illustrated in FIG. 7, the module supporting bracket 91 may be provided with an indicating portion 85 to allow a user to perceive the rotation angle of the module supporting bracket 91. In other words, the indicating portion 85 is formed on a side of the module supporting bracket 91 and a scale portion 86 may be formed on a portion of the feeding frame 60 which corresponds to the indicating portion 85, that is, which the indicating portion 85 faces and relatively moves with respect to. Since the indicating portion 85 is formed on an outer side of the module supporting bracket 91, the scale portion 86 is formed at a portion around the scanning module opening 67. Accordingly, the rotation angle of the module supporting bracket 91 is represented as movement of the indicating portion 85 with respect to the scale portion 86. The indicating portion 85 may be formed as far away as possible from the rotation shaft 92. The second scanning module 80 can be initially fixed so that a leading end 85a of the indicating portion 85 is aligned with a center line of the scale portion 86. After the duplex scanning is performed, the rear image of the scanned document can be analyzed to calculate a direction and an amount of movement of the indicating portion 85 for a vertical alignment of the second scanning module 80. The adjusting screw 97 can be rotated so that the squareness of the second scanning module 80 with respect to the document moving direction (arrow A) of the document moving route 70 is adjusted and become aligned with the second scanning module 80 so that skew to the document to be scanned can be minimized and/or prevented.

Referring to FIG. 6, the module supporting bracket 91 may include a plurality of fixing portions 87 in order to fix the module supporting bracket 91 to the feeding frame 60. The plurality of fixing portions 87 fix the up-down position of the second scanning module 80, that is, a vertical position of the second scanning module 80 with respect to the scanning module opening 67 of the feeding frame 60. The fixing portion 87 includes a fixing protrusion 87a that projects from the side surface of the module supporting bracket 91 and an elongated hole 87b formed on the fixing protrusion 87a. Fixing female screw portions 87c are formed on positions corresponding to the elongated hole 87b of the fixing portions 87 around the scanning module opening 67 of the feeding frame 60. In exemplary embodiments of the present general inventive concept, the module supporting bracket 91 is provided with two fixing portions 87 and the feeding frame 60 is provided with two fixing female screw portions 87c corresponding to the two fixing portions 87. As illustrated in FIG. 7, if the elongated hole 87b is formed on the indicating portion 85 and the fixing female screw portion 87c is formed at a side of the scale portion 86, the indicating portion 85 may be used as the fixing portions 87. After adjustment of the squareness of the second scanning module 80 is completed, a plurality of screws 87d are inserted into the elongated holes 87b of the plurality of fixing portions 87, and then, tightened to the fixing female screw portion 87c so that the second scanning module 80 is fixed to the feeding frame 60.

In the above description, the module supporting bracket 91 is formed separately from the second scanning module 80. However, the module supporting bracket 91 may be formed integrally with the second scanning module 80.

Referring to FIG. 3, a second document pressing member 79 is disposed in contact with the bottom surface 81 of the second scanning module 80, namely, the surface on which the image sensor of the second scanning module 80 is disposed below the second scanning module 80. The second document pressing member 79 presses the document having passed through the first scanning module 30 so that the rear side of the document contacts the bottom surface 81 of the second scanning module 80. The second document pressing member 79 includes a second pressing plate 79a in contact with the document and a second pressing spring 79b that presses the second pressing plate 79a toward the second scanning module 80.

Hereinafter, a method for adjusting the first scanning module 30 and the second scanning module 80 in order to prevent skew from occurring in the duplex scanning apparatus 10 according to an exemplary embodiment of the present general inventive concept having the above described structure will be explained with reference to the accompanying drawings.

To minimize and/or prevent skew from occurring in a front image of the document formed by the first scanning module 30, squareness between the document moving direction (arrow A) of the document moving route 70 and the lengthwise direction of the first scanning module 30 is adjusted.

For this, if a document is moved by the automatic document feeding apparatus 50, the front side of the document is scanned by the first scanning module 30 so as to form a first image data. At operation S10, it is determined whether there is skew in the first image data or not.

Referring to FIG. 5, if there is skew in the first image data, the squareness between the document moving direction (arrow A) of the document moving route 70 and the lengthwise direction of the first scanning module 30 can be adjusted. Referring to FIG. 5A, the automatic document feeding apparatus 50 can be adjusted by adjusting the hinges 52 so that the document moving direction (arrow A) of the document moving route 70 becomes perpendicular to the lengthwise direction of the first scanning module 30, and thereby aligned with the first scanning module 30 so that skew to the document to be scanned can be minimized and/or prevented when the automatic document feeding apparatus 50 is placed to cover the platen glass 21.

As illustrated in FIG. 5A, to adjust the squareness between the document moving direction (arrow A) of the document moving route 70 and the lengthwise direction of the first scanning module 30, the hinge position of the automatic document feeding apparatus 50 with respect to the scan case 20 is adjusted so that the document moving direction (arrow A) of the document moving route 70 forms a right angle to the lengthwise direction of the first scanning module 30 at operation S20. In other words, if the positions of the two hinges 52 of the automatic document feeding apparatus 50 which are inserted in the two hinge fixing portions 22 of the scan case 20 are adjusted, the first scanning module 30 can be adjusted so that the lengthwise direction of the first scanning module 30 forms a right angle to the document moving direction (arrow A) of the document moving route 70 to allow the document moving direction (arrow A) of the document moving route 70 to become aligned with the first scanning module 30. When the automatic document feeding apparatus 50 is closed to cover the platen glass 21, and scanning is resumed, the skew to the document scanned by the first scanning module can be minimized and/or prevented.

After a determination is made as to whether the hinges 52 need to be adjusted so that the document moving direction (arrow A) of the document moving route 70 becomes at a right angle to the lengthwise direction of the first scanning module 30 to align the document moving direction (arrow A) with the document moving route 70, operation S30 determines whether there is skew in a rear image of the document scanned by the second scanning module 80. If there is no skew in the rear image data, there is no need to adjust the squareness of the second scanning module 80. As a result, manufacture of the duplex scanning apparatus 10 is completed. After the squareness of the first and second scanning modules 20 and 80 is adjusted as described above, when the duplex scanning apparatus 10 according to the present disclosure performs a duplex scanning, no skew occurs in the front and rear images of the scanned document.

Referring to FIG. 9, if there is skew in the rear image at operation S30, the squareness of the second scanning module 80 may be adjusted at operation S40. When there is skew in the rear image, as illustrated in FIG. 9, the second scanning module 80 is inclined to the document moving direction (arrow A) of the document moving route 70. Accordingly, the scanning module adjusting unit 90 can adjust the second scanning module 80 to form a right angle to the document moving direction (arrow A) of the document moving route 70 to allow the second scanning module 80 to be aligned with the document moving direction (arrow A) of the document moving route 70 so that skew to the document to be scanned can be minimized and/or prevented.

FIGS. 9 and 10 illustrate an adjustment of the incline of the second scanning module 80 disposed inside the automatic document feeding apparatus 50 by the scanning module adjusting unit 90, FIGS. 9 and 10 schematically illustrate the automatic document feeding apparatus 50 where the cover 51 and the feeding tray 61 are removed and the second scanning module 80 is exposed. FIG. 9 is a view conceptually illustrating a state in that the second scanning module 80 is inclined with respect to the document moving direction. FIG. 10 is a view conceptually illustrating a state where the second scanning module 80 is at a right angle to the document moving direction.

A skew angle can be calculated from the rear image, and, using the skew angle, the angle between the lengthwise direction of the second scanning module 80 and the document moving direction (arrow A) of the document moving route 70 can be adjusted to become a right angle.

For this, the cover 51 and the feeding tray 61 can be separated from the automatic document feeding apparatus 50.

After the cover 51 and the feeding tray 61 are separated, as illustrated in FIG. 6, the second scanning module 80 is exposed. In FIG. 9, the adjusting screw 97 disposed in the feeding frame 60 is rotated in a direction needed. As illustrated in FIG. 9, the adjusting screw 97 can be rotated to move in the B direction, and the second scanning module 80 disposed on the module supporting bracket 91 is rotated in a clockwise direction (arrow C) based on the rotation shaft 92 so that the second scanning module 80 forms a right angle to the document moving direction (arrow A) of the document moving route 70 in the lengthwise direction thereof (see FIG. 10). At this time, the rotation angle of the second scanning module 80 is known from the number of scales as the indicating portion 85 moves with respect to the scale portion 86. For this, since relationship between the scales of the scale portion 86 and the rotation angle of the second scanning module 80 is predetermined, the number of scales to which the indicating portion 85 needs to be moved corresponding to the rotation angle of the second scanning module 80 can be easily determined. Accordingly, if the skew angle is calculated from the image data and a rotation angle of the second scanning module 80 is to be adjusted to remove the skew, the number of scales to which the indicating portion 85 needs to be moved can be determined.

As illustrated in FIG. 10, the adjusting screw 97 is rotated to move the indicating portion 85 as much as the calculated number of scales from the center of the scale portion 86, and the second scanning module 80 forms a right angle to the document moving direction (arrow A) of the document moving route 70. The skew in the rear image data can be minimized and/or prevented when the document is scanned by the duplex scanning apparatus 10 according to exemplary embodiments of the present general inventive concept wherein the squareness of the second scanning module 80 is adjusted.

As illustrated in FIG. 2A, the main body 100 of the image forming apparatus 1 is disposed below the above-described duplex scanning apparatus 10, and supports the duplex scanning apparatus 10. An image forming unit 101 to form a certain image on a printing medium is disposed inside the main body 100.

The image forming unit 101 prints the image data formed by the above-described duplex scanning apparatus 10 on the printing medium. Also, the image forming unit 101 receives printing data from a separate host 104, such as a personal computer, mobile phone, or laptop computer, and performs printing work or the like. The image forming unit 101 can use various printing methods such as an ink-jet printing method or an electro photographic image forming method. In this exemplary embodiment, the image forming unit using the electro photographic image forming method is disposed inside the main body 100.

The image forming unit 101 may include an exposure unit 110 emitting light corresponding to printing data, an image carrier 120 on which an electrostatic latent image is formed by the light emitted from the exposure unit 110, a developing unit 130 that supplies developer to the electrostatic latent image formed on the image carrier 120 to form a developer image, a transferring unit 140 to transfer the developer image formed on the image carrier 120 onto the printing medium, and a fusing unit 150 to fuse the transferred developer image onto the printing medium.

An interface unit 105 may be disposed in the main body 100 to provide a list of printing options in which to print the printing data received from the separate host 104. The interface unit 105 may include a keyboard, a keypad, a touch screen, a display, and/or any other suitable input/output device.

Further, a printing media supplying unit 170 that stores certain sheets of printing media, picks up the stored printing media one by one, and supplies it to the image forming unit may be disposed inside the main body 100 of the image forming apparatus 1.

In the above description, the duplex scanning apparatus 10 is disposed integrally with the image forming apparatus 1; however, this does not limit the present general inventive concept. The duplex scanning apparatus 10 according to the present general inventive concept may be formed in an independent flat bed scanner having the automatic document feeding apparatus 50 regardless of the image forming apparatus 1.

The image forming apparatus 1 having the above-described structure can scan both sides of a document being automatically supplied by the automatic document feeding apparatus 50 by using the duplex scanning apparatus 10.

Also, during usage of the duplex scanning apparatus 10, when skew occurs in an image data formed by scanning the rear side of the document, the adjusting screw 97 of the scanning module adjusting unit 90 is adjusted so as to minimize and/or prevent skew from occurring.

Therefore, with a duplex scanning apparatus according to exemplary embodiments of the present general inventive concept, since skew can be minimized and/or removed by rotation of an adjusting screw, complicated electronic circuits or software programs for compensating skewed images are not required.

While the embodiments of the present general inventive concept have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the present general inventive concept.

What is claimed is:

1. A duplex scanning apparatus comprising:
    a scan case comprising a platen glass;
    a first scanning module disposed inside the scan case;
    a scanning module moving unit disposed inside of the scan case perpendicular to the first scanning module and that guides a movement of the first scanning module; and
    an automatic document feeding apparatus disposed on a top side of the scan case to cover the platen glass, including:
        a feeding frame in which a document moving route is formed,
        a scanning module opening formed on an upper side of the document moving route in the feeding frame,
        a second scanning module disposed in the scanning module opening, and
        a scanning module adjusting unit formed to rotate the second scanning module at by a predetermined angle based on a point of the feeding frame with respect to the scanning module opening, such that an end of the second scanning module is rotatably fixed to the point as a single fulcrum to allow the second scanning module to rotate thereabout.

2. The duplex scanning apparatus of claim 1, wherein the scanning module adjusting unit comprises:
    a module supporting bracket that supports the second scanning module and is disposed to rotate with respect to the scanning module opening based on a rotation shaft disposed on the feeding frame; and
a module adjusting portion that is disposed in the feeding frame and applies force to the module supporting bracket so that the module supporting bracket is rotated based on the rotation shaft.

3. The duplex scanning apparatus of claim 2, wherein the scanning module adjusting unit further comprises:
an indicating portion disposed on a side of the module supporting bracket; and
a scale portion formed on a portion of the feeding frame corresponding to the indicating portion, wherein when the module supporting bracket rotates, the indicating portion is moved with respect to the scale portion.

4. The duplex scanning apparatus of claim 2, wherein the module supporting bracket further comprises:
a plurality of fixing portions to fix the module supporting bracket to the feeding frame.

5. The duplex scanning apparatus of claim 4, wherein each of the plurality of fixing portions comprises:
a fixing protrusion projecting from a side surface of the module supporting bracket; and
an elongated hole formed on the fixing protrusion.

6. The duplex scanning apparatus of claim 4, wherein the plurality of fixing portions are formed to fix a vertical position of the second scanning module, and
the module adjusting portion is formed to fix a horizontal position of the second scanning module.

7. The duplex scanning apparatus of claim 2, wherein the module adjusting portion comprises:
a female screw portion formed to face the second scanning module in the feeding frame; and
an adjusting screw that is screwed with the female screw portion and presses the module supporting bracket.

8. The duplex scanning apparatus of claim 7, wherein the module adjusting portion further comprises:
an elastic member that is disposed between the module supporting bracket and the feeding frame and that allows the adjusting screw to maintain contact with the module supporting bracket.

9. The duplex scanning apparatus of claim 2, wherein the module supporting bracket is formed integrally with the second scanning module.

10. The duplex scanning apparatus of claim 1 wherein a second document pressing member is disposed below the second scanning module.

11. An image forming apparatus comprising:
a duplex scanning apparatus;
a main body disposed to support the duplex scanning apparatus;
a printing media supplying unit that is disposed inside the main body and that stores and supplies printing media; and
an image forming unit that forms an image on a printing medium supplied from the printing media supplying unit,
wherein the duplex scanning apparatus comprises:
a scan case comprising a platen glass,
a first scanning module disposed inside the scan case,
a scanning module moving unit that is disposed inside of the scan case perpendicular to the first scanning module and that guides a movement of the first scanning module, and
an automatic document feeding apparatus disposed on a top side of the scan case to cover the platen glass, including:
a feeding frame in which a document moving route is formed,
a scanning module opening formed on an upper side of the document moving route in the feeding frame,
a second scanning module disposed in the scanning module opening, and
a scanning module adjusting unit formed to rotate the second scanning module by a predetermined angle based on a point of the feeding frame with respect to the scanning module opening, such that an end of the second scanning module is rotatably fixed to the point as a single fulcrum to allow the second scanning module to rotate thereabout.

12. The image forming apparatus of claim 11, wherein the scanning module adjusting unit comprises:
a module supporting bracket having a rotation hole to receive a rotation shaft, the module supporting bracket to support the scanning module adjusting unit and to rotate according to a movement of the rotation shaft that is inserted into the rotation hole; and
a module adjusting portion to adjust a position of the second scanning module in a horizontal direction and to support to the module supporting bracket to allow the module supporting bracket to rotate according to a movement of the rotation shaft that is inserted into the rotation hole.

13. The image forming apparatus of claim 12, wherein the module supporting bracket further comprises:
an indicating portion to display a rotation angle of the module supporting bracket.

14. An automatic document feeding apparatus comprising:
a feeding frame in which a document moving route is formed;
a scanning module opening formed on one side of the document moving route;
a scanning module disposed in the scanning module opening to scan a document that is advanced along the document moving route; and
a scanning module adjusting unit to rotate the scanning module based on the point such that an end of the second scanning module is rotatably fixed to the point as a single fulcrum to allow the second scanning module to rotate thereabout and the scanning module forms a right angle after the rotation with respect to a document moving direction of the document moving route to minimize an occurrence of skew.

15. The automatic document feeding apparatus of 14, wherein the scanning module adjusting unit comprises:
a module supporting bracket having a rotation hole to receive a rotation shaft to support the scanning module adjusting unit and to rotate according to a movement of the rotation shaft that is inserted into the rotation hole; and
a module adjusting portion to support the module supporting bracket to allow the module supporting bracket to rotate according to a movement of the rotation shaft that is inserted into the rotation hole.

16. The automatic document feeding apparatus of claim 15, wherein
the module supporting bracket comprises an indicating portion to display a rotation angle of the module supporting bracket.

17. The automatic document feeding apparatus of claim 15, further comprising:
an adjusting member disposed in the feeding frame of the automatic document feeding apparatus to be rotated so that the scanning module forms a right angle with respect to the document moving direction of the document moving route after the rotation.

18. A method of minimizing skew in a duplex scanning apparatus having a first scanning module and a second scanning module, the method comprising:
- determining whether there is skew in a first image of a first side of a document scanned by the first scanning module;
- adjusting a position between a document moving direction of a document moving route in the duplex scanning apparatus and a lengthwise direction of the first scanning module if skew is detected in the first image;
- determining whether there is skew in a second image of a second side of the document scanned by the second scanning module; and
- adjusting a position between the second scanning module and the document moving direction of the document moving route if skew is detected in the second image, such that an end of the second scanning module is rotatably fixed to the point as a single fulcrum to allow the second scanning module to rotate thereabout.

19. The method of claim 18, further comprising:
adjusting a hinge position of the duplex scanning apparatus so that the document moving direction of the document moving route forms a right angle to the lengthwise direction of the first scanning module.

20. The method of claim 18, further comprising:
adjusting a scanning module adjusting unit disposed in the duplex scanning apparatus so that the second scanning module forms a right angle with the document moving direction of the document moving route.

21. The method of claim 20, further comprising:
rotating an adjusting member disposed in a feeding frame of the duplex scanning apparatus so that the second scanning module rotates and forms a right angle with the document moving direction of the document moving route.

\* \* \* \* \*

UNITED STATES PATENT AND TRADEMARK OFFICE
CERTIFICATE OF CORRECTION

| | | |
|---|---|---|
| PATENT NO. | : 9,154,657 B2 | Page 1 of 1 |
| APPLICATION NO. | : 13/739195 | |
| DATED | : October 6, 2015 | |
| INVENTOR(S) | : Sang-il Lee et al. | |

It is certified that error appears in the above-identified patent and that said Letters Patent is hereby corrected as shown below:

In the Specification

Column 1, Line 10

Delete "Jan. 12, 2012" and insert --Jan. 13, 2012--, therefor.

In the Claims

Claim 1, Column 14, Line 58

Delete "module at" and insert --module--, therefor.

Claim 15, Column 16, Line 47

Delete "of 14," and insert --of claim 14,--, therefor.

Signed and Sealed this
Sixteenth Day of February, 2016

Michelle K. Lee
*Director of the United States Patent and Trademark Office*